United States Patent
Bering et al.

(10) Patent No.: US 6,663,744 B1
(45) Date of Patent: Dec. 16, 2003

(54) METHOD AND DEVICE FOR HEAT TREATMENT OF A DISC

(75) Inventors: Lars Gustaf Magnus Bering, Täby (SE); Rolf Tommy Nils Karlsson, Västra Frölunda (SE); Claes Lannart Eriksson, Bagarmossen (SE); Lars Göran Eriksson, Strängnäs (SE); Per Ove Öhman, Uppsala (SE)

(73) Assignee: OTB Group B.V., Eindhoven (NL)

( * ) Notice: Subject to any disclaimer, the term of this patent is extended or adjusted under 35 U.S.C. 154(b) by 0 days.

(21) Appl. No.: 09/623,088

(22) PCT Filed: Feb. 27, 1998

(86) PCT No.: PCT/NL98/00117

§ 371 (c)(1),
(2), (4) Date: Nov. 20, 2000

(87) PCT Pub. No.: WO99/43481

PCT Pub. Date: Sep. 2, 1999

(51) Int. Cl.[7] .......................... G11B 7/26; B32B 31/04; B32B 31/28
(52) U.S. Cl. .............. 156/275.5; 156/272.2; 156/273.3; 156/273.7; 156/275.7; 156/498; 369/286
(58) Field of Search ............ 156/272.2, 273.3, 156/273.7, 275.5, 275.7, 498; 369/286

(56) References Cited

U.S. PATENT DOCUMENTS

| | | | | |
|---|---|---|---|---|
| 5,779,855 A | * | 7/1998 | Amo et al. | 156/275.7 |
| 5,900,098 A | * | 5/1999 | Mueller et al. | 156/275.7 |
| 2002/0108715 A1 | * | 8/2002 | Higaki et al. | 156/273.7 |

FOREIGN PATENT DOCUMENTS

| | | |
|---|---|---|
| JP | 8-87779 | 4/1996 |
| JP | 10255339 A * | 9/1998 ............ G11B/7/26 |

OTHER PUBLICATIONS

Patent Abstracts of Japan vol. 096, No. 008, Aug. 30, 1996 & JP 08 087779 A (NKK Corp; Dainippon Ink & Amp; Chem Inc), Apr. 2, 1996, see abstract.
Patent Abstracts of Japan vol. 016, No. 103 (M–1221), Mar. 13, 1992 & JP 03 278938 A (Hitachi Metals Ltd), Dec. 10, 1991, see abstract.
Patent Abstracts of Japan, vol. 007, No. 183 (M–235), Aug. 12, 1983 & JP 58 084730 A ( Sanyo Denki KK), May 20, 1983 see abstract.
Patent Abstracts of Japan, vol. 010, No. 338 (P–156), Nov. 15, 1986 & JP 61 139957 A (Matsushita Electric Ind Co Ltd.), Jun. 27, 1986, see abstract.
Patent Abstracts of Japan vol. 097, No. 010, Oct. 31, 1997 & JP 09 147425 A (Dainippon Ink & Amp; Chem Inc ), Jun. 6, 1997, see abstract.
Patent Abstracts of Japan vol. 010, No. 147 (P–460), May 29, 1986 & JP 60 263354 A ( Nippon Denki KK), Dec. 26, 1985, see abstract.
Patent Abstracts of Japan vol. 013, No. 054 (P–824), Feb. 8, 1989 & JP 63–244429 A (Hitachi Chem Co Ltd), Oct. 11, 1988, see abstract.
Patent Abstracts of Japan vol. 017, No. 477 (P–1603), Aug. 30, 1993 & JP 05 114174 A (Ricoh Co Ltd ), May 7, 1993, see abstract.

(List continued on next page.)

*Primary Examiner*—Adrienne C. Johnstone
(74) *Attorney, Agent, or Firm*—Pillsbury Winthrop LLP

(57) ABSTRACT

Method and device for heat treatment of a disc, whereby the disc (1) is placed on a carrier (14) after which the disc is irradiated. During the radiation the carrier is kept on a desired temperature. The desired temperature of the carrier is about the temperature of the disc prior to placement on the carrier. The disc comprises two disc elements and an adhesive layer between the disc elements, whereby the adhesive layer is cured by the irradiation with ultraviolet light.

4 Claims, 2 Drawing Sheets

OTHER PUBLICATIONS

Patent Abstracts of Japan, vol. 010 No. 316 (P–510), Oct. 28, 1986 & JP 61 126648 A ( Nippon Telegr & Teleph Corp ) Jun. 14, 1986, see abstract.

Patent Abstracts of Japan, vol. 011, No. 181 (P–585), Jun. 11, 1987 & JP 62 009547 A (Matsushita Electric Ind Co Ltd.), Jan. 17, 1987, see abstract.

Database WPI, Section EI, Week 9841 Derwent Publications Ltd., London, GB; AN 98–472383 XP002083229 & JP 10 199053 A ( Origin Electric Co Ltd), Jul. 31, 1998, see abstract.

* cited by examiner

METHOD AND DEVICE FOR HEAT TREATMENT OF A DISC

This application is the national phase of international application PCT/NL 98/00117 filed Feb. 27, 1998 which designated the U.S.

The invention relates to a method for heat treatment of a disc, whereby the disc is placed on a carrier after which the disc is irradiated.

The invention also relates to a device for heat treatment of a disc according to said method.

By such a method and device, which are known from the international patent application WO 97/36738 a disc comprising two disc elements with an adhesive layer between them, is placed on a carrier after which the disc is irradiated by UV light and the adhesive layer is cured.

The UV light will also heat up the carrier and when a new disc is placed on the carrier, the disc will be warped due to the temperature difference which occurs between the disc element located on the carrier and the other disc element. The time between placing the disc onto the carrier and the irradiation of the disc is too short to stabilize the temperature of the disc. It is an object of the invention to provide a method whereby undesired warping of the disc is avoided.

This object is achieved in that during the irradiation the carrier is kept on a desired temperature.

By controlling the temperature of the carrier, the warping of the disc can also be controlled.

In a preferred embodiment of the method according to the invention the desired temperature of the carrier is about the temperature of the disc prior to placement on the carrier.

In this way the disc will not be subjected to a change of temperature.

If, however, a certain controlled warp is desired, for example to have a compensation for a tilt during a later process step, the temperature of the carrier is kept at another predetermined value.

In another preferred embodiment a method according to the invention the disc comprises two disc elements and an adhesive layer between the disc elements, whereby the adhesive layer is cured by the irradiation with ultraviolet light.

Due to the vacuum the disc is kept flat against the carrier. Furthermore a good contact between the disc and the carrier is obtained due to which the heat transfer function is the same all across the disc.

The invention will further be described with reference to the drawings in which

Figure 1:
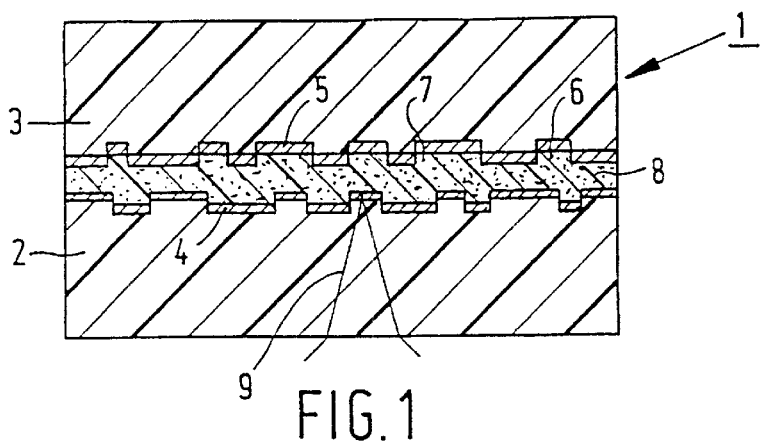
Figure 2:
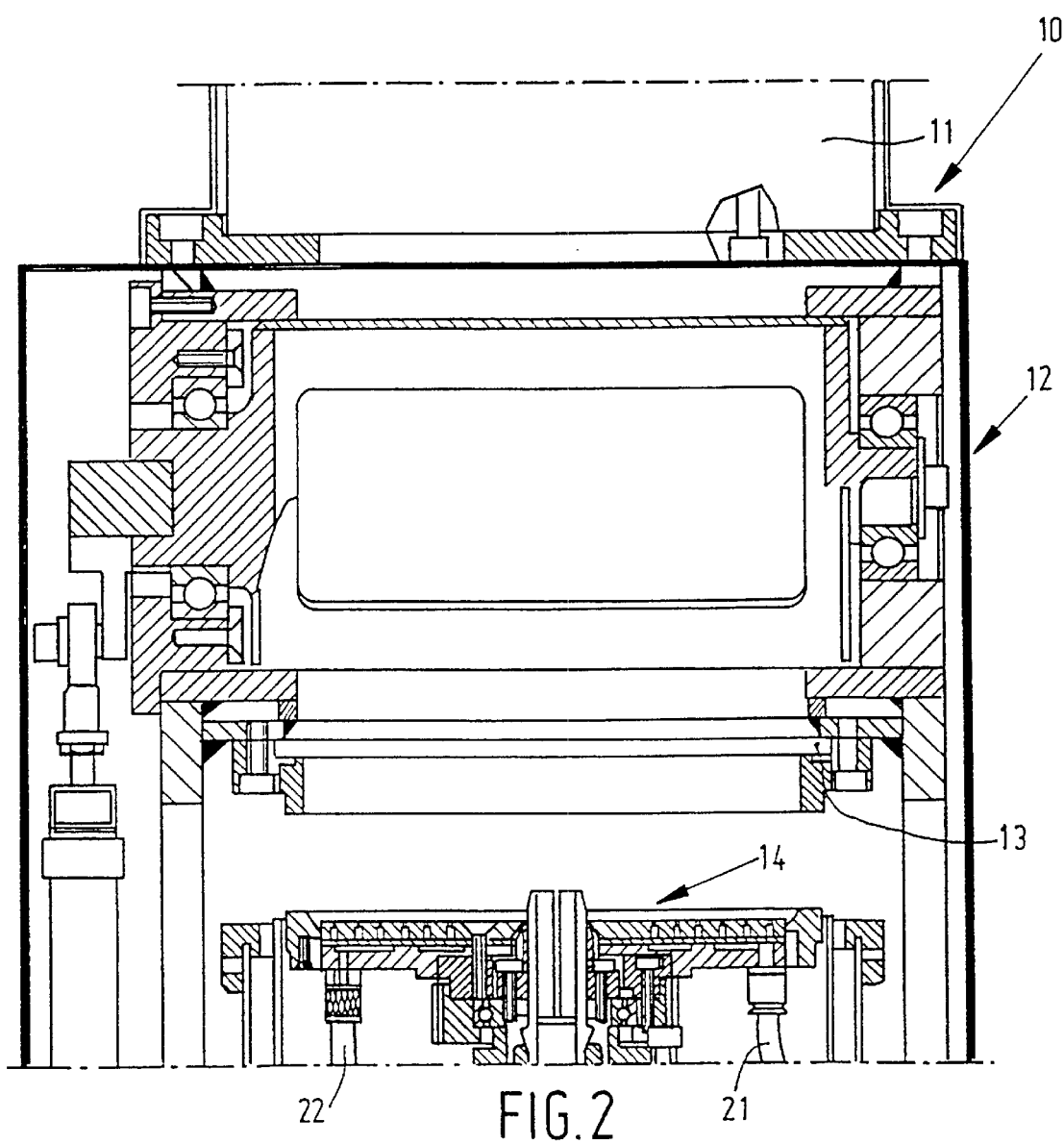
Figure 3:
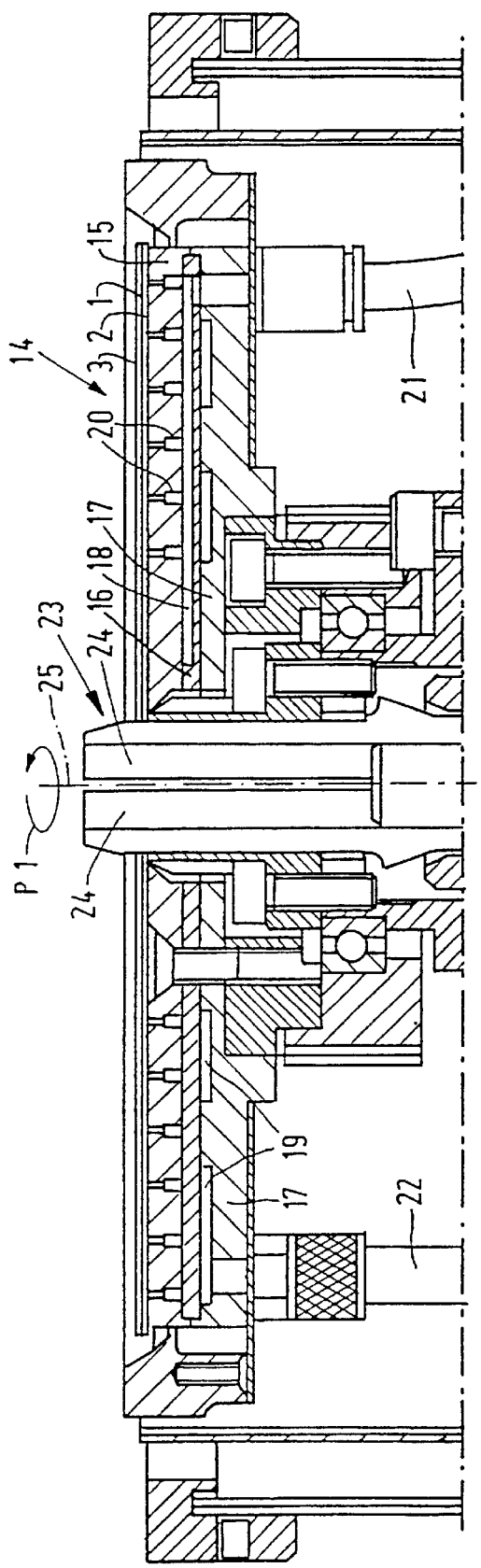
Figure 4:
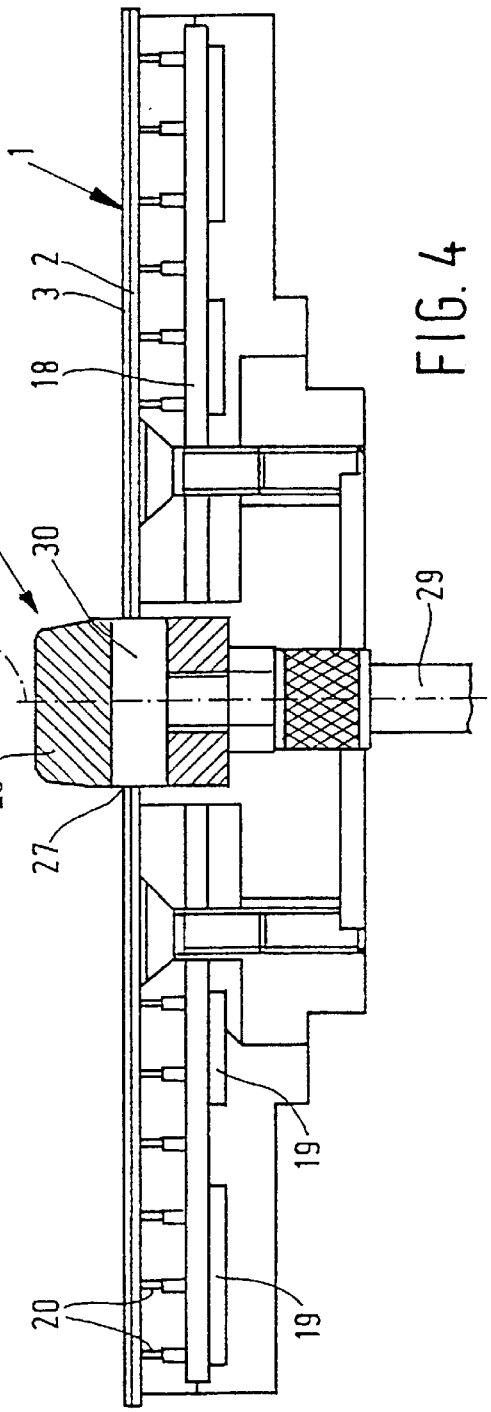

FIG. 1 shows a schematic enlarged cross section of a part of a so called DVD-9 type illustrating it's construction, FIG. 2 shows a schematic cross section of a device according to the invention, FIG. 3 shows an schematic cross section of a carrier of the device as shown in FIG. 2, FIG. 4 shows a cross section of another embodiment of a carrier according to the invention.

Like parts are numbered alike in the figures.

FIG. 1 shows schematically a digital data storing disc of DVD format, namely a so-called digital video disc 1 of the type called DVD-9. Such a disc 1 comprises two disc elements 2, 3, each having a thickness of 0.6 mm and a diameter of circa 120 mm and made of a transparent plastic material such as polycarbonate. Each disc element 2, 3 respectively has an information layer 4, 5 respectively on facing sides containing short 6 and long 7 depressions with a depth of about 0.1 $\mu$m. The information layer 5 on the upper disc element 3 is coated with a layer of for example Al, Au or SiN which is semi-reflecting for laser light, while the information layer 4 on the lower disc element 2 is made completely reflecting. The two disc elements 2, 3 are joined together by means of a thin adhesive layer 8 (circa 40–70 $\mu$m), the index of refraction of which should be complementary to the index of reflection of the disc elements (polycarbonate) in order to avoid any refractive error when the laser light is to read the upper information layer 5. In FIG. 1, a light beam 9 is shown which is focused on the lower, semi-reflecting layer 4.

In FIG. 2 a device 10 according to the invention is shown which is provided with a UV light source 11, a shutter mechanism 12 and a quartz plate 13 located on an opposite side of the shutter mechanism as the UV light source 11. Under the quarts plate 13 a carrier 14 is located which is shown in more detail in FIG. 3. The carrier 14 comprises three interconnected plates 15, 16, 17 between which vacuum channels 18 and water channels 19 are located. To the vacuum channel 18 vacuum ducts 20 are connected. These vacuum ducts 20 are open on the side directed to the UV light source 11. The vacuum channel 18 is connected to a vacuum pump (not shown) via a tube 21. The water channels 19 are connected to a water inlet tube 22 and a water outlet tube (not shown). The carrier 14 is provided with a centering device 23 comprising four fingers 24 which can be moved in the radial direction to center the two disc elements 2, 3 with respect to each other on the plate 15. The carrier 14 is rotatable around the central axis 25 in the direction indicated by arrow P1 and the opposite direction by means of a stepper motor (not shown).

Below the working of the device 10 according to the invention will be explained in more detail.

In a separate station the adhesive layer 8 is applied between the two disc elements 2, 3 in a manner known for example from the international patent application WO 97/36737. After the adhesive layer is spread between the two disc elements, the disc elements are positioned around the centering device 23 and are centered to each other by moving the fingers 24 in a radial outwardly direction. Then the disc element 2 is attracted against the plate 15 by vacuum via the vacuum ducts 20. The sub pressure of the vacuum can be in the range of 0.1–0.8 bar. In the mean time water is inserted via the inlet tube 22 into the water channels 19 due to which the plates 15, 16, 17 will obtain a predetermined temperature, for example the temperature of the discs 2, 3 prior to placement into the device 10. The temperature of the water will for example be in the range of 20–45° C. As soon as the disc 1 is held flat and firmly against the plate 15, the carrier 14 is rotated into the direction indicated by arrow P1 and the UV light source 11 is switched on, whereby due to the rotation of the carrier 14 an uniform irradiation of the discs 1 will occur. The UV light is shined on to the disc 1 from above through the shutter mechanism 12 and the quarts plate 13.

After the first curing of the adhesive layer 8, the disc 1 is loaded on an output turntable. The centering of the disc 1 is controlled with a clearance measuring device and the discs that fail will end up on a reject spindle. After the checking of the alignment the disc 1 is finally cured within a second cure station consisting of two lamps exposing the disc from both sides via a shutter mechanism and shielding quarts plates. At the second cure station the carrier can be transparent, like in the international patent application WO 97/36738 or support the disc only at the outer rim. If this is the case, the adhesive in the outer rim needs to be cured fully in the first station.

The temperature of the carrier 14 is measured by sensors (not shown) and depending on the desired temperature of the carrier 14 the flow of water through the channels 19 and/or the temperature of the water is changed.

FIG. 4 shows a cross section of another embodiment of a device according to the invention which is provided with a centering device 26 instead of the centering device 23. The centering device 26 comprises a cylinder 27 with a relatively thin wall which is closed by a cap 28 on one side and which is in open communication with a tube 29 at the opposite side. Via the tube 29 a fluidum can be inserted in the chamber 30 defined by the cylinder 27 and the cap 28 whereby depending on the pressure of the fluidum the cylinder 27 will be expanded and will center the two disc elements 2, 3 with respect to each other.

Due to the method according to the invention, the angular deviation of the DVD discs is well within the DVD specifications.

It is also possible to use another fluid than water to control the temperature of the carrier 14.

The device according to the invention can also be used for other treatments of discs like coat processes as spin coating.

Also DVD-5, DVD-10 and other single, double or triple discs can be treated according to the method of the invention.

What is claimed is:

1. A method for manufacturing a disc, the method comprising:

placing two disc elements on top of each other whereby an adhesive layer is provided between the two disc elements to form a disc;

placing the disc on a carrier wherein the disk is at a temperature;

irradiating the disc with ultraviolet radiation;

curing the adhesive layer by the ultraviolet radiation; and keeping the carrier at a desired temperature during said irradiating by sending a cooling fluid through cooling channels in the carrier, wherein said desired temperature is about the temperature of the disc prior to placing the disc on the carrier.

2. The method according to claim 1, further comprising holding said disc on said carrier by vacuum.

3. The method according to claim 1, wherein after irradiation of the disc, placing the disc on a second carrier, and irradiating the disc from both sides of the second carrier.

4. A method for manufacturing a disc, the method comprising:

placing two disc elements on top of each other whereby an adhesive layer is provided between the two disc elements to form a disc;

placing the disc on a carrier;

irradiating the disc;

curing the adhesive layer by the ultraviolet radiation; and keeping the carrier at a desired temperature during said irradiating to control the warp of the disc by sending a cooling fluid through cooling channels in the carrier.

* * * * *